(No Model.)

J. THOMSON.
MECHANISM FOR CONTROLLING AND TRANSMITTING THE ACTION OF OSCILLATING DISKS.

No. 452,489. Patented May 19, 1891.

Witnesses
Geo. W. Breck
C. E. Ashley

Inventor:
John Thomson

UNITED STATES PATENT OFFICE.

JOHN THOMSON, OF BROOKLYN, ASSIGNOR TO THE THOMSON METER COMPANY, OF NEW YORK, N. Y.

MECHANISM FOR CONTROLLING AND TRANSMITTING THE ACTION OF OSCILLATING DISKS.

SPECIFICATION forming part of Letters Patent No. 452,489, dated May 19, 1891.

Application filed January 3, 1891. Serial No. 376,664. (No model.)

*To all whom it may concern:*

Be it known that I, JOHN THOMSON, a citizen of the United States, residing at Brooklyn, Kings county, New York, have invented certain new and useful Improvements in Mechanism for Controlling and Transmitting the Action of Oscillating Disks, of which the following is a specification.

This invention relates to oscillating-disk actions; and it consists in mechanism for controlling and transmitting the action of the disk, substantially as set forth hereinafter, and illustrated in the accompanying drawings, in which—

Figure 2:
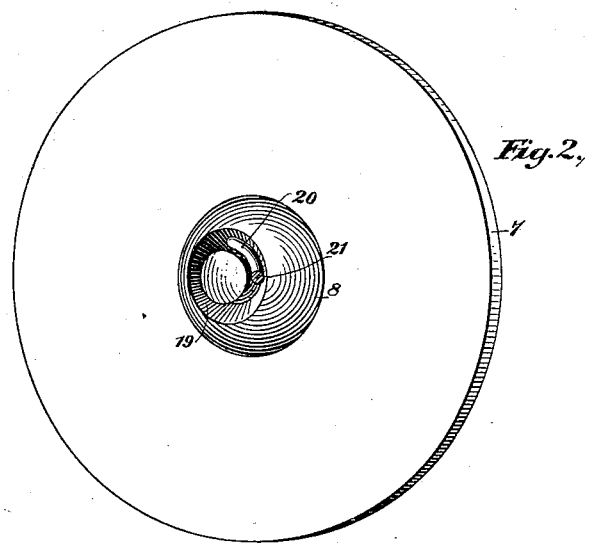
Figure 1:
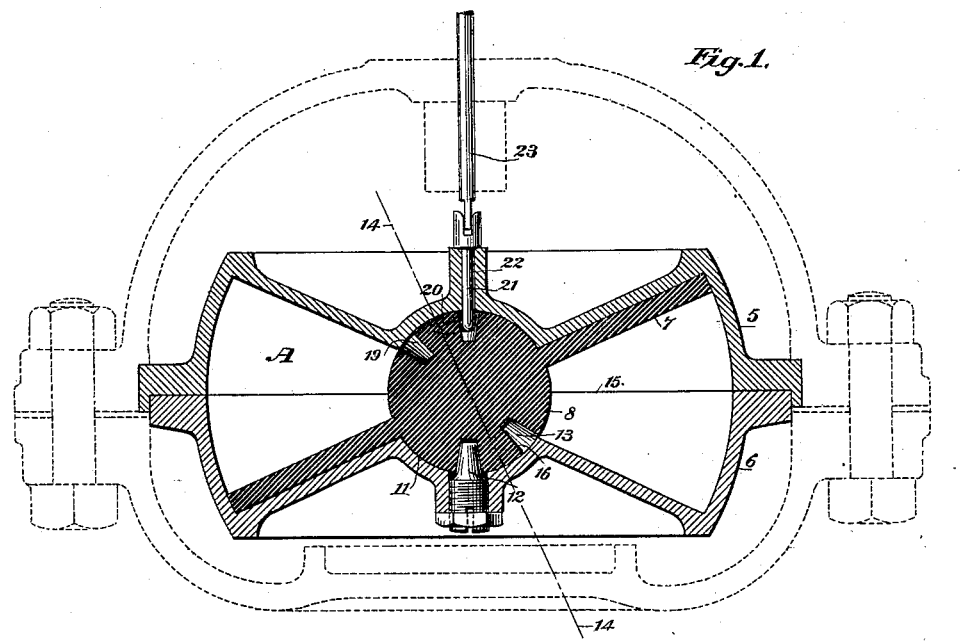

Figure 1 is a vertical central section through a disk-chamber, casing, and disk, the arrangement being such as might be employed in water-meters, showing my improvement as applied to the upper and lower sections of the casing and to the ball of the disk. Fig. 2 is a top perspective view of the disk and ball developed from Fig. 1.

It is not thought necessary to here describe the action of the disk, as it is well understood by mechanicians; but in this construction reference may be made to my patents, Nos. 387,828 and 387,829. The disk-chamber A as usually constructed is in a casing formed of two sections—an upper 5 and lower 6. Operating within this chamber is the disk 7 with its ball 8. Now, bearing in mind that the oscillation of the disk produces in its central axis at a right angle to the plane of the disk rotary or gyrating motion, the means hereinafter set forth, first for controlling the proper motion of the disk—that is, to maintain its contact with the frustums of the chamber—and next for transmitting its motion, will be readily understood. Thus the control of the disk is effected by attaching to the center of the socket 11 of the lower section of the disk-casing a stud 12, which projects into the annular recess or a groove 13, formed in the exterior of the ball. The common axis or center 14 of the groove is at a right angle to the plane of the disk. The axis of the fixed stud is in the center of the disk-chamber vertical to the plane 15 thereof. The consequence of this arrangement and disposal is that the annular recess formed in the ball gyrates in a circle around the fixed stud, the inner wall 16 of the recess, in connection with the fixed stud, thus acting together as bearings to insure the proper motion of the disk.

The stud may be made conical, as shown, the walls of the recess converging toward the center of the ball, as such construction, in connection with the threaded stud 12 and jam-nut therefor, permits of ready adjustment and affords means of compensation for wear, and is, in fact, the theoretically best form; but this is not necessary to the operation of the device, as a cylindrical or other form of stud will operate effectively. It is also evident that a roller might be mounted upon the end of the stud to operate within the recess.

The motion of the disk is communicated to the exterior of the casing by forming another recess, as 19, in the opposite surface of the ball, into which is adapted the arm 20 of the spindle 21, mounted in the hub 22 of the upper casing, which in turn may engage a stuffing-box shaft, as 23. In this instance the gyrating motion of the recess transmits constant circular motion to the arm and spindle. The spindle, instead of having an arm, may simply be flattened where it lies within the groove, by which means circular motion will be transmitted effectively.

Having thus described my invention, what I claim, and desire to secure by Letters Patent, is—

1. In an oscillating-disk action, the combination, with the chamber, disk, and ball, of the circular recess formed in the exterior of the ball and the fixed stud adapted to act therein for the purpose of controlling the action of the disk.

2. The combination, with the disk and ball having a groove with converging faces, of an adjustable conical stud, substantially as described.

3. In an oscillating-disk action, the combination, with the chamber, disk, and ball, of the circular recess formed in the exterior of the ball and the spindle properly adapted thereto to be revolved upon its axis by the gyration of the recess for the purpose of transmitting the action of the disk, substantially as described.

4. In an oscillating-disk action, the combination; with the chamber, disk, ball, stud, and spindle, of the circular recesses formed in the exterior of the ball, one recess acting with the stud to control the movement of the disk and the other recess acting with the spindle to transmit the motion of the disk, substantially as specified.

In testimony whereof I have signed my name to this specification in the presence of two subscribing witnesses.

JOHN THOMSON.

Witnesses:
FRANK LAMBERT,
EDWD. K. ANDERTON.